(12) United States Patent
Hwang

(10) Patent No.: US 6,850,770 B2
(45) Date of Patent: Feb. 1, 2005

(54) TRANSMIT POWER CONTROL (TPC) PATTERN INFORMATION IN RADIO LINK (RL) ADDITION

(75) Inventor: Woonhee Hwang, Helsinki (FI)

(73) Assignee: Nokia Corporation, Espoo (FI)

( * ) Notice: Subject to any disclaimer, the term of this patent is extended or adjusted under 35 U.S.C. 154(b) by 526 days.

(21) Appl. No.: 09/859,897

(22) Filed: May 17, 2001

(65) Prior Publication Data

US 2002/0173329 A1 Nov. 21, 2002

(51) Int. Cl.$^7$ ................................................. H04Q 7/20
(52) U.S. Cl. ..................... 455/522; 455/69; 455/453; 455/456; 455/450; 455/452.1
(58) Field of Search .......................... 455/522, 69, 453, 455/436, 450, 452.1; 370/328

(56) References Cited

U.S. PATENT DOCUMENTS

| | | |
|---|---|---|
| 5,416,779 A | 5/1995 | Barnes et al. |
| 5,673,031 A | 9/1997 | Meier |
| 5,940,771 A | 8/1999 | Gollnick et al. |
| 5,987,099 A | 11/1999 | O'Neill et al |
| 6,122,262 A | 9/2000 | Desseignes et al. |
| 2001/0046220 A1 * | 11/2001 | Koo et al. ................... 370/335 |
| 2002/0094817 A1 * | 7/2002 | Rune et al. .................. 455/450 |
| 2002/0128035 A1 * | 9/2002 | Jokinen et al. .............. 455/552 |

OTHER PUBLICATIONS

3G TS 25.331 v3.2.0 (2000–03); 3rd Generation Partnership Project; Technical Specification Group Radio Access Network; RRC Protocol Specification (Release 1999).

* cited by examiner

Primary Examiner—Nick Corsaro
Assistant Examiner—Alan Gantt

(57) ABSTRACT

A first radio link set (RLS) indicator parameter is added to a radio link addition request message on Iub and on Iur. As in the case of radio link setup, the first RLS indicator IE used in the radio link addition request message indicates if the added RL is to be considered part of the first RLS established toward this UE in that frequency. If the first RLS indicator IE is set to "first RLS", which means interfrequency handover, the Node B shall use a TPC pattern of (n×01)+1 in the downlink of the added RL and all RLs which are part of the same RLS, until UL synchronization is achieved on the Uu. The parameter n is set equal to the value received in the DL TPC pattern 01 count IE in the cell setup procedure. The TPC pattern is continuously repeated, but restarted at the beginning of every frame with Connection Frame Number (CFN) mod 4=0. For all other RLs, the Node B uses a TPC pattern of all ones in the downlink until uplink synchronization is achieved on the Uu.

20 Claims, 1 Drawing Sheet

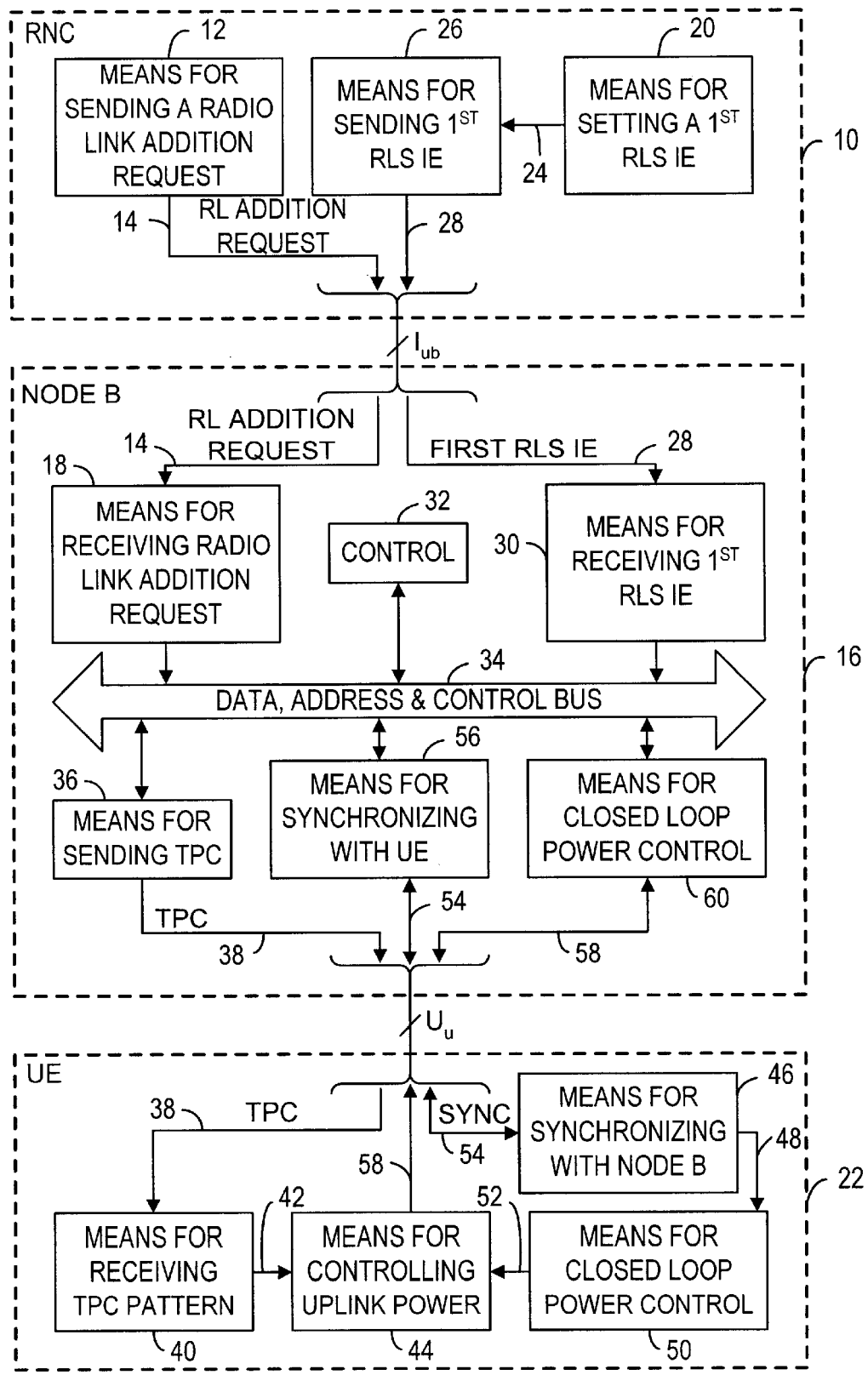

TRANSMIT POWER CONTROL (TPC) PATTERN INFORMATION IN RADIO LINK (RL) ADDITION

BACKGROUND OF THE INVENTION

1. Technical Field

The present invention relates to mobile telecommunications and, more particularly, to an improved radio link addition procedure.

2. Discussion of Related Art

The radio link addition procedure is used in the 3rd Generation Partnership Project (3GPP) for establishing the necessary resources in the logical node (Node B) responsible for radio transmission/reception in one or more cells to/from the user equipment (UE). It does this by adding one or more additional radio links (RLs) toward a UE when there is already a Node B communication context for this UE in the Node B. Such is described, for instance, in 3GPP TS 25.433 v.4.0.0 (2001–03) "UTRAN Iub Interface NBAP Signaling (Release 4)" at Chapter 8.3 "NBAP Dedicated Procedures", as well as in 3GPP TS 25.423 v.3.3.0 (2000–09) "UTRAN Iur Interface RNSAP Signaling" at Chapter 8.3.2 entitled "Radio Link Addition". The procedure includes sending a radio link addition request from a serving RNC (SRNC) to a drift radio network controller (DRNC) and is concluded by the DRNC sending back a radio link addition response to the SRNC. Likewise, the radio link addition request is provided from a controlling RNC (CRNC) to the Node B in question, which in turn responds back to the CRNC with a radio link addition response.

At the present time, if a handover occurs from one RNC to another, and that handover is an inter-frequency handover, there is no way for the Node B to know whether or not the radio link is part of a first radio link set (RLS) established towards this UE. In other words, there is a need to know if the radio link should be considered part of the first RLS established toward this UE in the particular frequency to which the handover is directed. If it is, then there will be no uplink synchronization yet, and the Node B should be sending out a transmit power control (TPC) pattern appropriate in the circumstances. During interfrequency handover, Node B has to acquire synchronization again, as distinguished from soft handover, where synchronization does not have to be reacquired. The inner loop power control procedure, which is defined in 3G TS 25.214 v.4.0.0 (2001–03) at Chapter 5, is not utilized until uplink synchronization is achieved.

DISCLOSURE OF INVENTION

An object of the present invention is to provide an indication to the Node B as to whether an RL being added should be considered part of the first RLS established towards a particular UE or not.

Another object of the present invention is to permit a Node B to transmit a proper TPC pattern in the downlink of an added RL and all RLs which are part of the same RLS, until uplink synchronization is achieved on the radio interface.

According to a first aspect of the present invention, a method comprises the steps of preparing a radio link addition request for communication from a radio network controller (RNC) to a logical node (Node B) responsible for radio transmission/reception in one or more cells to/from a user equipment (UE), and in case an added radio link is a part of a first radio link set (RLS) established toward the UE, setting an information element (IE) indicative of said first RLS established toward the UE, and sending said IE to the Node B from the RNC along with or separately from the radio link addition request.

According further to the first aspect of the invention, the method further comprises the steps of receiving said IE from said RNC at said Node B and thereafter, for cases of inter-frequency handover of said added radio link, sending a transmit power control (TPC) pattern from said Node B to said UE until uplink synchronization of said added radio link is achieved with power-up commands interspersed with a series of alternative power-up and power-down commands, and commencing a closed-loop power control procedure after said synchronization is achieved.

According still further to the first aspect of the invention, the TPC pattern comprises n instances of digital symbols zero and one (01) plus one instance of digital symbol one (1) wherein n is determined from a second information element sent from the RNC to the Node B and wherein said pattern is repeated periodically.

Still further according to the first aspect of the invention, for cases of soft handover of said added radio link, in case said added radio link is not a part of said first RLS established toward said UE, said TPC pattern is sent with all power-up commands until said uplink synchronization of said added radio link is achieved.

According to a second aspect of the invention, a method comprises the steps of receiving a radio link addition request from a radio network controller (RNC) at a logical node (Node B) responsible for radio transmission/reception in one or more cells to/from a user equipment (UE), and in case an added radio link is a part of a first radio link set (RLS) established toward the UE, receiving, at said Node B, an information element (IE) indicative of said first RLS established between the RNC and the Node B and thereafter, for cases of interfrequency handover of said added radio link, sending a transmit power control (TPC) pattern from said Node B to said UE with power-up commands interspersed with a series of alternating power-up and power-down commands until uplink synchronization of said added radio link is achieved.

According further to the second aspect of the invention, the TPC pattern comprises n instances of digital symbols zero and one (01) plus one instance of digital symbol one (1) wherein n is determined from a second information element sent from the RNC to the Node B and wherein said pattern is repeated periodically.

Still further according to the second aspect of the invention, for cases of soft handover of said added radio link, in case said added radio link is not a part of said first RLS established toward said UE, said TPC pattern is sent with all digital one (1) symbols.

According to a third aspect of the invention, a method, for use before achievement of synchronization of an uplink from a user equipment (UE) to a logical node (Node B) responsible for radio transmission/reception in one or more cells to/from said UE in case said uplink is part of a radio link that is in turn part of a first radio link set (RLS) established toward the UE, if said establishment comprises a radio link addition to said first radio link set, comprises the steps of receiving a transmit power control (TPC) signal pattern with power-up commands interspersed with a series of alternating power-up and power-down commands from said Node B at said UE until uplink synchronization is achieved between the UE and the Node B, and controlling uplink power on said uplink according to said TPC pattern periodically repeated until said uplink synchronization is achieved, after which a closed-loop power control procedure is commenced between said Node B and said UE.

According further to the third aspect of the invention, the TPC pattern is periodic and comprises n instances of digital symbols zero and one (01) plus one instance of digital symbol one (1) wherein n is determined from a second information element sent from the RNC to the Node B.

Still further according to the third aspect of the invention, for cases of soft handover of said added radio link, in case said added radio link is not part of saif first RLS established toward said UE, said TPC pattern is sent with all digital one (1) symbols.

According to a fourth aspect of the invention, an apparatus comprises means for preparing and sending a radio link addition request for communication from a radio network controller (RNC) to a logical node (Node B) responsible for radio transmission/reception in one or more cells to/from a user equipment (UE), and in case an added radio link is a part of a first radio link set (RLS) established toward the UE, means for setting an information element (IE) indicative of said first RLS established toward the UE, and means for sending said IE to the Node B from the RNC along with or separately from the radio link addition request.

According further to the fourth aspect of the invention, the apparatus further comprises means for receiving said IE from said RNC at said Node B and thereafter, for cases of inter-frequency handover of said added radio link, sending a transmit power control (TPC) pattern from said Node B to said UE until uplink synchronization of said added radio link is achieved with power-up commands interspersed with a series of alternative power-up and power-down commands, and means for operating a closed-loop power control procedure after said synchronization is achieved.

Still further according to the fourth aspect of the invention, the TPC pattern comprises n instances of digital symbols zero and one (01) and one plus one instance of digital symbol one (1) wherein n is determined from a second information element sent from the RNC to the Node B and wherein said pattern is repeated periodically.

Further still according to the fourth aspect of the invention, for cases of soft handover of said added radio link, in case said added radio link is not part of said first RLS established toward said UE, said TPC pattern is sent with all power-up commands.

According to a fifth aspect of the invention, an apparatus comprises means for receiving a radio link addition request from a radio network controller (RNC) at a logical node (Node B) responsible for radio transmission/reception in one or more cells to/from a user equipment (UE), means for receiving, at said Node B, in case an added radio link is a part of a first radio link set (RLS) established toward the UE, an information element (IE) indicative of said first RLS toward the UE, and means for sending a transmit power control (TPC) pattern from said Node B to said UE, for cases of interfrequency handover of said added radio link, with power-up commands interspersed with a series of alternating power-up and power-down commands until uplink synchronization of said added radio link is achieved.

According further to the fifth aspect of the invention, the TPC pattern comprises n instances of digital symbols zero and one (01) plus one instance of digital symbol one (1) wherein n is determined from a second information element sent from the RNC to the Node B and wherein said pattern is repeated periodically.

Still further according to the fifth aspect of the invention, for cases of soft handover of said added radio link, in case said added radio link is not part of said first RLS established toward said UE, said TPC pattern is sent with all digital one (1) symbols.

According to a sixth aspect of the invention, an apparatus, for use before achievement of synchronization of an uplink from a user equipment (UE) to a logical node (Node B) responsible for radio transmission/reception in one or more cells to/from said UE in case said uplink is part of a radio link that is in turn part of a first radio link set (RLS) established toward the UE if said establishment comprises a radio link addition to said first radio link set, comprises means for receiving a transmit power control (TPC) signal pattern with power-up commands interspersed with a series of alternating power-up and power-down commands from said Node B at said UE until uplink synchronization is achieved between the UE and the Node B, and means for controlling uplink power on said uplink according to said TPC pattern periodically repeated until said uplink synchronization is achieved, after which a closed-loop power control procedure is commenced between said Node B and said UE.

According further to the sixth aspect of the invention, the TPC pattern is periodic and comprises n instances of digital symbols zero and one (01) plus one instance of digital symbol one (1) wherein n is determined from a second information element sent from the TNC to the Node B.

According still further to the sixth aspect of the invention, for cases of soft handover of said added radio link, unless said added radio link is part of said first RLS established toward said UE, said TPC pattern is sent with all digital one (1) symbols until said uplink synchronization of said added radio link is achieved.

These and other objects, features and advantages of the present invention will become more apparent in light of the detailed description of a best mode embodiment thereof, as illustrated in the accompanying drawing.

BRIEF DESCRIPTION OF THE DRAWING

The sole FIGURE shows a system, according to the present invention, with a radio network controller (RNC), a logical node (Node B) responsible for radio transmission/reception in one or more cells to/from a user equipment (UE).

BEST MODE FOR CARRYING OUT THE INVENTION

3GPP Technical Specification 3G TS 25.401 v.3.2.0 (2000–03) "UTRAN Overall Description", shows the Universal Mobile Telecommunications System (UMTS) as comprising a core network (CN) connected over an Iu interface to a UMTS Terrestrial Radio Access Network (UTRAN) which is in turn connected to a user equipment (UE) over a Uu (radio) interface. The UTRAN architecture includes multiple radio network subsystems (RNSs) connected to the core network via Iu interfaces and interconnected to each other via Iur interfaces. Each RNC is connected by means of one or more Iub interfaces to logical nodes (Node Bs) responsible for radio transmission/reception in one or more cells to/from the user equipment (UE). A Node B can support frequency division duplex (FDD) mode, time division duplex (TDD) mode or dual-mode operation. A UE is capable of transmission between two or more Node Bs at the same time, and the information is communicated over the Iur interface between RNCs. The controlling RNC is responsible for any handover decisions that may have to be signaled to the UE. For each connection between a UE and the UTRAN, one RNS is the "serving" RNS. When required, drift RNSs support the serving RNS by providing radio resources, as shown in the 3G TS 25.401 specification. The role of an RNS (serving or drift) is on a per connection basis between a UE and the UTRAN.

The handover function is based on radio measurements, and it is used to maintain the quality of service requested by the core network. The handover strategy employed by the network for radio link control determines the handover decision that will be made based on the measurement results reported by the UE/RNC and various parameters set for each cell. Network-directed handover might also occur for reasons other than radio link control, e.g., to control traffic distribution between cells. A given network operator determines the exact handover strategies, but possible types include 3G-3G handover, FDD soft/softer handover, FDD inter-frequency hard handover, FDD/TDD handover, TDD/FDD handover, TDD/TDD handover, 3G-2G handover and vice versa. Causes for initiation of a handover process are many, including uplink quality, uplink signal measurements, downlink, downlink signal measurements, distance, change of service, better cell, O&M intervention, directed retry, traffic, pre-emption, etc. The hard handover procedure is described in 3GPP TS 25.303 v.4.0.0 (2001–03) entitled "InterLayer Procedures in Connected Mode". Fig. 33 thereof illustrates a hard handover and shows the SRNC-RRC first configuring Layer 1 of the Node B and RNC over the Iub to activate new radio links. Layer 1 begins transmission and reception on new links immediately. The SRNC-RRC then sends the UE RRC a handover command message which indicates the radio resources that should be used for the new radio link. The UE RRC configures the UE L1 to terminate reception on the old radio link and begin reception on the new radio link. After the UE L1 has achieved downlink synchronization on the new frequency, an L2 link is established and the UE RRC sends a handover complete message to the SRNC-RRC. After having received the L3 acknowledgement, the SRNC-RRC configures the network L1 to terminate reception and transmission on the old radio link.

Regarding soft handover, it is described in 3G TR 25.922 v.3.1.0 (2000–03) at Chapter 5.1.4. There, soft handover is described as a handover in which the mobile station starts communication with a new node B on a same carrier frequency, or sector of the same site (softer handover) performing at most a change of code. With reference to soft handover, the "active set" is defined as the set of Node Bs the UE is simultaneously connected to, i.e., the UTRA cells currently assigning a downlink DPCH to the UE constitute the active set. The soft handover procedure is composed of a number of single functions: (1) measurements, (2) filtering of measurements, (3) report of measurements results, (4) the soft handover algorithm, and (5) execution of handover.

The measurement of the monitored cells filtered in a suitable way trigger the reporting events that constitute the basic input of the soft handover algorithm. The definition of "active set", "monitored set", as well as the description of all reporting events, are given in TS 25.331. Based on the measurements of the set of cells monitored, the soft handover function evaluates if any Node B should be added to (radio link addition), removed from (radio link removal), or replaced in (combined radio link addition and removal) the active set; performing then what is known as "active set update" procedure. An example of a soft handover algorithm, as well as its execution, is shown in Chapter 5.1.4.2 and 5.1.4.3 of 3G TR 25.922, as well as Annex C thereof, which shows a flowchart of a soft handover algorithm.

3GPP TS 25.303 v.4.0.0 (2001–03) shows radio link addition for FDD in Fig. 30 thereof. As suggested above, radio link addition is triggered in the network RRC layer by measurement reports sent by the UE. The network RRC first configures the new radio link on the physical layer. Transmission and reception begin immediately. The network RRC then sends an RRC active set update message to the UE RRC. The UE RRC configures Layer 1 to begin reception. After confirmation from the physical layer in UE, an active set update complete message is sent to the RNC-RRC.

For purposes of the present invention, an RNC 10 is shown in the figure as including a means 12 for preparing and ultimately sending a radio link addition request on a line 14 over an Iub interface to a Node B 16, where it is received by a means 18 for receiving a radio link addition request. The RNC 10 is also shown as including a means 20 for setting a first radio link set (RLS) information element (IE) in case the radio link to be added should be considered part of the first radio link set (RLS) established toward a user equipment (UE) 22 shown in the figure. If so, the first RLS IE is set and communicated on a line 24 to a means 26 for sending the first RLS IE on a line 28 over the Iub interface to the Node B 16. The IE on the line 28 may be sent along with the request on the line 14 over the Iub or may be sent separately. It should be noted that this first RLS IE is a departure from the prior art, where the radio link addition request did not include provision for sending a first RLC IE to the Node B. This was only done in the prior art in connection with a radio link setup procedure, such as described in TS 25.433 v.4.0.0 (2001–03) at Chapter 8.2.17 (compare with Chapter 8.3.1), or in TS 25.423 v.3.3.0 (2000–09) at Chapter 8.3.1 (compare with Chapter 8.3.2).

According to the present invention, the RNC, in sending a radio link addition request to the Node B or to another (drift) RNC also sends a first RLS IE, i.e., in order to indicate whether the radio link to be added is to be considered part of a first RLS established toward the UE 22.

In that case, the Node B 16 (or the drift RNC and then the Node B) will be equipped with means 30, responsive to the first RLS IE signal on the line 28 for processing same in conjunction with the RL addition request signal on the line 14 and a control means 32 which is in communication with the means 18 and the means 30 over a data, address and control bus 34 internal to the Node B 16. From the foregoing, it will be understood that the radio link addition request signal on the line 14 is sent by the radio network controller 10 to the logical node 16 and, in case the radio link to be added is a part of a first radio link set established toward the UE, a first RLS IE is set so as to be indicative of such a condition of being the first RLS established toward the UE, and that the IE is sent to the Node B by the RNC.

The Node B 16 then receives the IE on the line 28 with the means 30 and thereafter, for cases of inter-frequency handover of the added radio link in soft handover, a transmit power control (TPC) signal pattern is sent from the Node B to the UE 22 by a means 36, which is under the control of the control means 32. A TPC signal is shown on a line 38 being sent from the Node B to the UE 22 over the Uu interface. This TPC pattern is sent until uplink synchronization of the added radio link is achieved, with power-up commands interspersed with a series of alternating power-up and power-down commands, so that the power up commands predominate slightly but are not overwhelmingly power-up commands. This is continued until uplink synchronization of the added radio link is achieved. At that point, a synchronization means 46 in the UE communicates over a signal line 48 with a means 50 for closed-loop power control. The means 50 sends a control signal on a line 52 to the means 44 for controlling uplink power, which then commences the normal inner loop power control of the dedicated physical channel. This is described in 3G TS 25.214 v.4.0.0. (2001–03) at Chapter 5. Of course, the means 46 for synchronizing with Node B is in communication on a signal line 54 over the Uu interface with a means 56 resident in the Node B for synchronizing with the UE. Likewise, the means 50 for closed loop power control resident in the UE is in communication on a signal line 58 with a means 60 in the Node B for controlling power using the inner loop control methodology of TS 25.214.

The TPC pattern signaled on the line 38 may comprise n instances of digital symbols "0" and "1" (01), plus one instance of digital symbol "1" (1), wherein n is determined from a second information element sent from the RNC to the Node B and wherein the pattern is repeated periodically. This kind of signaling is already known from TPC command generation on the downlink during RL initialization, as per 3GPP TS 25.214 v.4.4.0 (2001–03), Chapter 5.1.2.2.1.2. This pattern continuously repeats but is forcibly restarted at the beginning of each frame, when the CFN mod 4 equals zero. If the first RLS indicator is not set, then the TPC pattern consists of all "1"s. The TPC pattern terminates once uplink synchronization is achieved.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method, comprising the steps of:
    preparing a radio link addition request for communication from a radio network controller (RNC) to a logical node (Node B) responsible for radio transmission/reception in one or more cells to/from a user equipment (UE), and in case an added radio link is a part of a first radio link set (RLS) established toward said UE,
    setting an information element (IE) indicative of said first RLS established toward said UE, and
    sending said IE to the Node B from the RNC along with or separately from the radio link addition request.

2. The method of claim 1, further comprising the steps of:
    receiving said IE from said RNC at said Node B and thereafter, for cases of inter-frequency handover of said added radio link, sending a transmit power control (TPC) pattern from said Node B to said UE until uplink synchronization of said added radio link is achieved with power-up commands interspersed with a series of alternative power-up and power-down commands, and
    commencing a closed-loop power control procedure after said synchronization is achieved.

3. The method of claim 2, wherein said TPC pattern comprises n instances of digital symbols zero and one (01) plus one instance of digital symbol one (1) wherein n is determined from a second information element sent from the RNC to the Node B and wherein said pattern is repeated periodically.

4. The method of claim 2, wherein for cases of soft handover of said added radio link, unless said added radio link is part of said first RLS, said TPC pattern is sent with all power-up commands.

5. Method, comprising the steps of:
    receiving a radio link addition request from a radio network controller (RNC) at a logical node (Node B) responsible for radio transmission/reception in one or more cells to/from a user equipment (UE), and in case an added radio link is a part of a first radio link set (RLS) established toward said UE,
    receiving, at said Node B, an information element (IE) indicative of said first RLS established toward said UE and thereafter, for cases of interfrequency handover of said added radio link,
    sending a transmit power control (TPC) pattern from said Node B to said UE with power-up commands interspersed with a series of alternating power-up and power-down commands until uplink synchronization of said added radio link is achieved.

6. The method of claim 5, wherein said TPC pattern comprises n instances of digital symbols zero and one (01) plus one instance of digital symbol one (1) wherein n is determined from a second information element sent from the RNC to the Node B and wherein said pattern is repeated periodically.

7. The method of claim 5, wherein for cases of soft handover of said added radio link, unless said added radio link is part of said first RLS, said TPC pattern is sent with all digital one (1) symbols.

8. Method, for use before achievement of synchronization of an uplink from a user equipment (UE) to a logical node (Node B) responsible for radio transmission/reception in one or more cells to/from said UE in case said uplink is part of a radio link that is in turn part of a first radio link set (RLS) established toward said UE, if said establishment comprises a radio link addition to said first radio link set, comprising the steps of:
    receiving a transmit power control (TPC) signal pattern with power-up commands interspersed with a series of alternating power-up and power-down commands from said Node B at said UE until uplink synchronization is achieved between the UE and the Node B, and
    controlling uplink power on said uplink according to said TPC pattern periodically repeated until said uplink synchronization is achieved, after which a closed-loop power control procedure is commenced between said Node B and said UE.

9. The method of claim 8, wherein said TPC pattern is periodic and comprises n instances of digital symbols zero and one (01) plus one instance of digital symbol one (1) wherein n is determined from a second information element sent from the TNC to the Node B.

10. The method of claim 8, wherein for cases of soft handover of said added radio link, unless said added radio link is part of said first RLS, said TPC pattern is sent with all digital one (1) symbols.

11. Apparatus, comprising:
    means for preparing and sending a radio link addition request for communication from a radio network controller (RNC) to a logical node (Node B) responsible for radio transmission/reception in one or more cells to/from a user equipment (UE), and in case an added radio link is a part of a first radio link set (RLS) established toward said UE,
    means for setting an information element (IE) indicative of said first RLS established toward said UE, and
    means for sending said IE to the Node B from the RNC along with or separately from the radio link addition request.

12. The apparatus of claim 11, further comprising:
  means for receiving said IE from said RNC at said Node B and thereafter, for cases of inter-frequency handover of said added radio link, sending a transmit power control (TPC) pattern from said Node B to said UE until uplink synchronization of said added radio link is achieved with power-up commands interspersed with a series of alternative power-up and power-down commands, and
  means for operating a closed-loop power control procedure after said synchronization is achieved.

13. The apparatus of claim 12, wherein said TPC pattern comprises n instances of digital symbols zero and one (01) and one plus one instance of digital symbol one (1) wherein n is determined from a second information element sent from the RNC to the Node B and wherein said pattern is repeated periodically.

14. The apparatus of claim 12, wherein for cases of soft handover of said added radio link, unless said added radio link is part of said first RLS, said TPC pattern is sent with all power-up commands until said uplink synchronization of said added radio link is achieved.

15. Apparatus, comprising:
  means for receiving a radio link addition request from a radio network controller (RNC) at a logical node (Node B) responsible for radio transmission/reception in one or more cells to/from a user equipment (UE),
  means for receiving, at said Node B, in case an added radio link is a part of a first radio link set (RLS) established toward said UE, an information element (IE) indicative of said first RLS established toward said UE, and
  means for sending a transmit power control (TPC) pattern from said Node B to said UE, for cases of interfrequency handover of said added radio link, with power-up commands interspersed with a series of alternating power-up and power-down commands until uplink synchronization of said added radio link is achieved.

16. The apparatus of claim 15, wherein said TPC pattern comprises n instances of digital symbols zero and one (01) plus one instance of digital symbol one (1) wherein n is determined from a second information element sent from the RNC to the Node B and wherein said pattern is repeated periodically.

17. The apparatus of claim 15, wherein for cases of soft handover of said added radio link, unless said added radio link is part of said first RLS, said TPC pattern is sent with all digital one (1) symbols until said uplink synchronization of said added radio link is achieved.

18. Apparatus, for use before achievement of synchronization of an uplink from a user equipment (UE) to a logical node (Node B) responsible for radio transmission/reception in one or more cells to/from said UE in case said uplink is part of a radio link that is in turn part of a first radio link set (RLS) established toward said UE if said establishment comprises a radio link addition to said first radio link set, comprising:
  means for receiving a transmit power control (TPC) signal pattern with power-up commands interspersed with a series of alternating power-up and power-down commands from said Node B at said UE until uplink synchronization is achieved between the UE and the Node B, and
  means for controlling uplink power on said uplink according to said TPC pattern periodically repeated until said uplink synchronization is achieved, after which a closed-loop power control procedure is commenced between said Node B and said UE.

19. The apparatus of claim 18, wherein said TPC pattern is periodic and comprises n instances of digital symbols zero and one (01) plus one instance of digital symbol one (1) wherein n is determined from a second information element sent from the TNC to the Node B.

20. The apparatus of claim 18, wherein for cases of soft handover of said added radio link, unless said added radio link is part of said first RLS, said TPC pattern is sent with all digital one (1) symbols until said uplink synchronization of said added radio link is achieved.

* * * * *